(12) United States Patent
Eckert et al.

(10) Patent No.: US 8,180,142 B2
(45) Date of Patent: May 15, 2012

(54) TEST FAIL ANALYSIS ON VLSI CHIPS

(75) Inventors: Martin Eckert, Moetzingen (DE);
Georg Goecke, Steinenbronn (DE);
Marta Junginger, Altdorf (DE); Klaus Kempter, Weil im Schoenbuch (DE);
Markus Ulbricht, Espenhain (DE)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 12/326,166

(22) Filed: Dec. 2, 2008

(65) Prior Publication Data
US 2010/0135570 A1    Jun. 3, 2010

(51) Int. Cl.
*G06K 9/03*    (2006.01)
(52) U.S. Cl. ...................................................... 382/149
(58) Field of Classification Search .................. 382/145, 382/147, 149
See application file for complete search history.

(56) References Cited

U.S. PATENT DOCUMENTS

| | | | |
|---|---|---|---|
| 5,771,243 A | 6/1998 | Lee et al. | |
| 6,200,823 B1 * | 3/2001 | Steffan et al. | 438/14 |
| 6,259,827 B1 * | 7/2001 | Nichani | 382/291 |
| 6,449,743 B1 | 9/2002 | Hosokawa | |
| 6,885,977 B2 * | 4/2005 | Gavra et al. | 702/185 |
| 7,283,659 B1 * | 10/2007 | Bakker et al. | 382/149 |
| 7,333,962 B2 | 2/2008 | Zen | |
| 2002/0184587 A1 | 12/2002 | Boateng | |
| 2003/0088564 A1 | 5/2003 | Lohmann et al. | |
| 2003/0140287 A1 | 7/2003 | Wu et al. | |
| 2004/0141640 A1 | 7/2004 | Lee et al. | |
| 2007/0226555 A1 | 9/2007 | Raines | |
| 2007/0288219 A1 * | 12/2007 | Zafar et al. | 703/14 |
| 2008/0301597 A1 * | 12/2008 | Chen et al. | 716/5 |

FOREIGN PATENT DOCUMENTS

EP    1 313 030 A2    10/2002

* cited by examiner

*Primary Examiner* — Kara E Geisel
(74) *Attorney, Agent, or Firm* — Cantor Colburn LLP; Libby Toub

(57) ABSTRACT

Compact graphical representations of common test fail signatures and process related test fails are provided through methods of selecting, calculating and/or presenting information. The input may be a list of failing tests on a sample of devices under test from chip and/or wafer process fails. The failing tests are identified and then other tests that fail at the same time may be identified. Several graphical outputs are provided, including all possible combinations between test fails and between test fails and process fails. The dependencies are printed as sorted two dimensional bitmaps that are compact representations of the results using color codes. Subtraction of two independent bitmaps is provided, which eliminates common properties and emphasizes differences between multiple bitmaps which allows for quick identification of differences of process fails potentially different between the two different bitmaps indicating potential root causes for the selected one of the test fails.

25 Claims, 14 Drawing Sheets
(11 of 14 Drawing Sheet(s) Filed in Color)

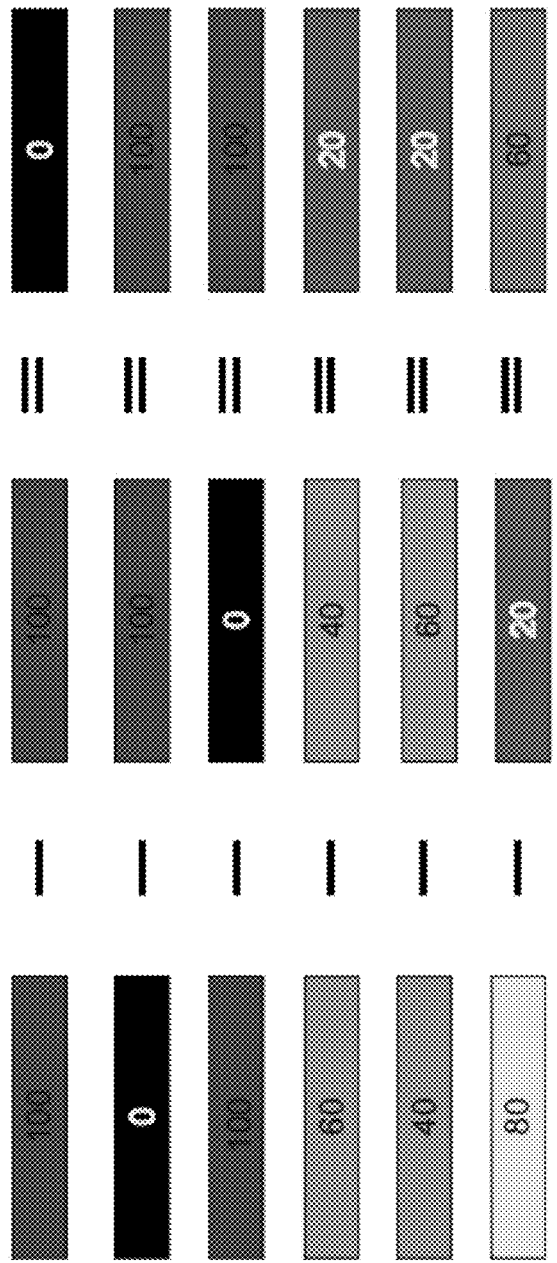
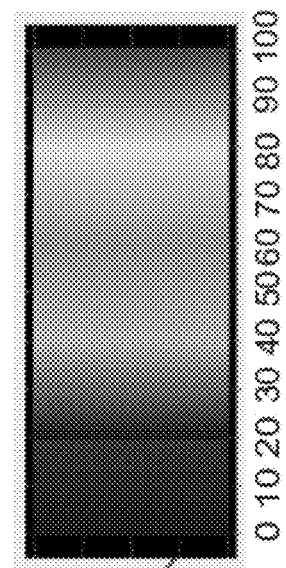
FIG. 3 maxLOA2g32kW2abist_mfgiowrap_ac_dcpll_pci19a_pllhi_Lock_pll_pci4a_pllhi_Freqpll_srv3a_pllhi_Lockpsro

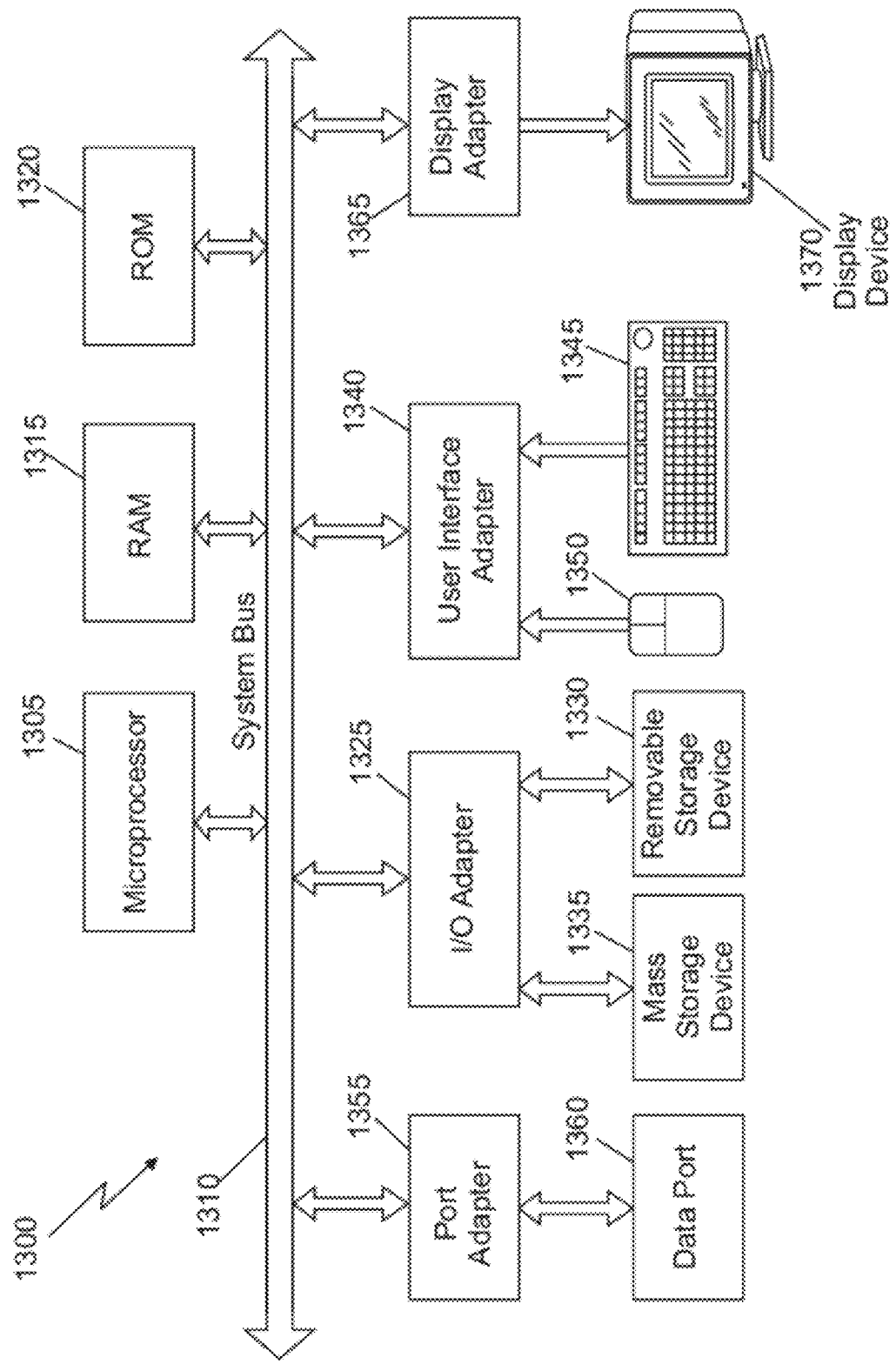

TEST FAIL ANALYSIS ON VLSI CHIPS

BACKGROUND

The present invention relates to semiconductor manufacturing technology, and, more specifically, to the analysis and determination of potential process driven test fails during very large scale integrated circuit (VLSI) chip testing and to finding common test fail signatures when running different test patterns indicating potential redundant test patterns.

Process related chip test issues are difficult to identify and map to test fails at the chip tester by the test engineer who normally is not a process engineer. Identified dependencies between test fails and process fails allow one to determine whether chip test fails are somehow related to process fails coming from production. Especially in the design phase of VLSI chip components, it is more often the case that circuit designs are used in test chips or intermittent design levels of product chips without having final product quality. When such a chip is tested in a fabric test environment, some test fails can happen. These fails can have multiple root causes, but mainly there exist two aspects: either design sensitivities against certain valid process parameters or process tolerances leaving or outside of valid ranges.

In addition, test patterns may be optimized against a test model representing the chip or device under test. Optimization targets for test patterns may include test time, test volume (i.e., size), test coverage, etc. It is known to find redundant test patterns to reduce test time and test data volume without reducing test coverage. However, there are process variations in the chip fabric that are not necessarily fed back or reflected in the test model for the device or design under test. This leads to slightly changing test fail signatures over time and over the wide process range or tolerances for such a device under test. Understanding common fail signatures when running different test patterns can indicate potential redundant tests.

BRIEF SUMMARY

According to an embodiment of the invention, a method includes generating a first image by performing an analysis on a set of test fails that contains at least one test fail which occurs more often than others within the set of test fails, wherein the test fails occur on at least one wafer under test. The method also includes generating a second image from at least one of the test fails, and subtracting the second image from the first image to generate a resulting image, wherein the resulting image indicates any potential root causes between both the first and second images. Other embodiments of the invention include a computer program product that includes a computer-readable computer program code for a method, and instructions for causing a computer to implement the method embodiment of the invention. Also, a system includes a computing network including a processing device in communication with one or more computer memory storage devices, and the computing network being further configured to implement the method embodiment of the invention. Still other embodiments of the invention include a method that includes the steps of determining one or more process fails on a wafer hosting a chip under test, and determining one or more test fails on the wafer under test. The method also includes analyzing the one or more process fails to the one or more test fails on the wafer under test using a selected one of the one or more test fails, generating an array as a result of the analyzing step, generating a first image from the generated array, generating a second image from any one or more of the test fails, and subtracting the second image from the first image to generate a resulting image, wherein the resulting image indicates any differences between the first and second images.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee. The subject matter which is regarded as the invention is particularly pointed out and distinctly claimed in the claims at the conclusion of the specification. The foregoing and other features and advantages of the invention are apparent from the following detailed description in conjunction with the accompanying drawings in which:

FIGS. 2A-2C, are graphs of an example of a process-to-test-fail subtraction method according to an embodiment of the invention;

FIG. 3 illustrates various examples of the subtraction of one color from another used in the subtraction method of FIG. 2;

FIG. 13 is a schematic block diagram of a general-purpose computer suitable for practicing embodiments of the present invention.

DETAILED DESCRIPTION

Figure 1A:
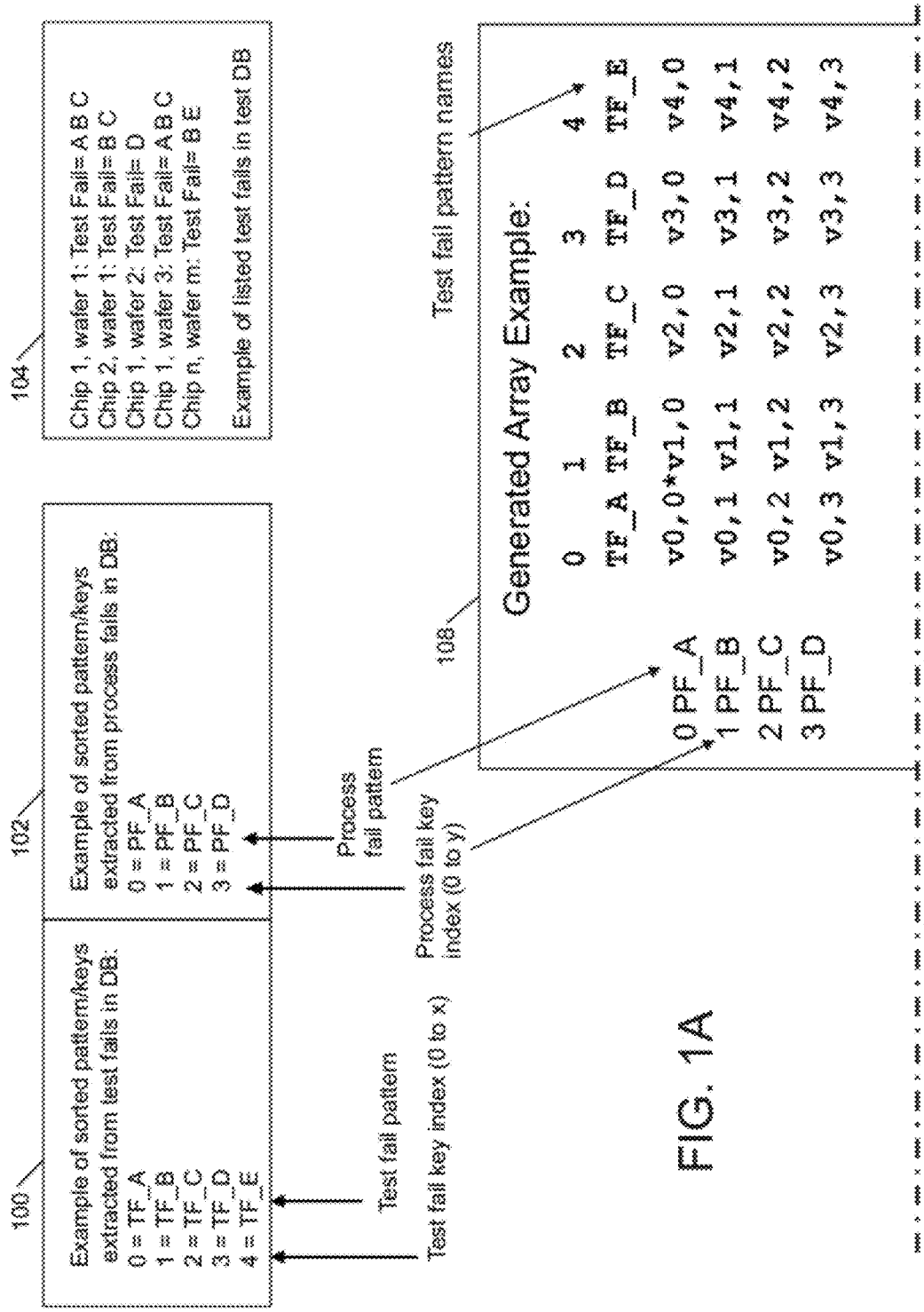
FIG. 1 illustrates an exemplary embodiment of the mechanics of process fail to test fail analysis.
Figure 1B:
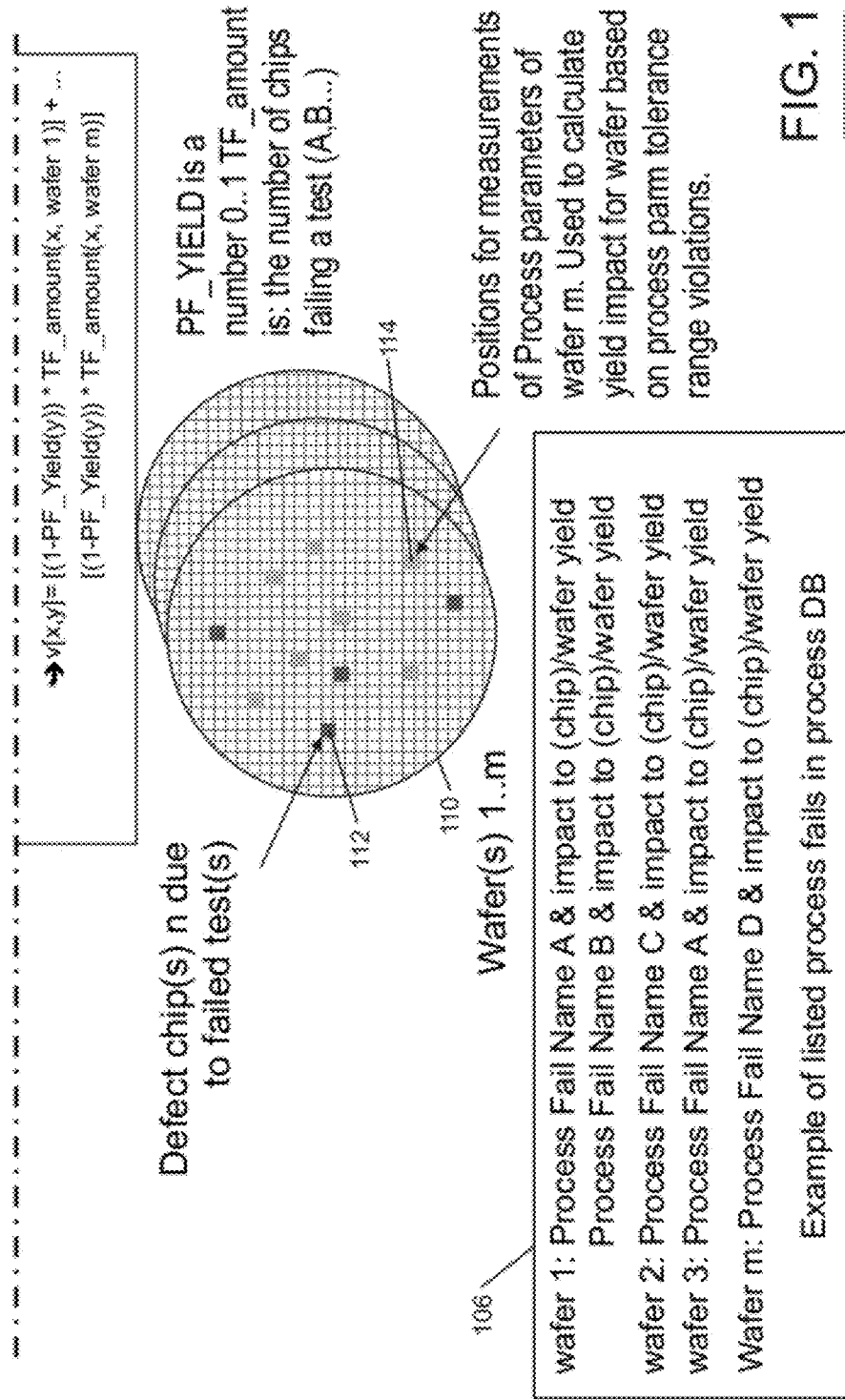
Figure 1:
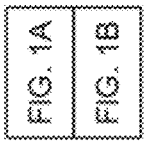

Referring to FIG. 1, there illustrated is an exemplary embodiment of the mechanics of process fail to test fail analysis and determination. As used herein, a test fail generally refers to an issue with the design of the chip or integrated circuit (IC), while a process fail generally refers to an issue with a physical reference on or associated with the chip, for example, the length of a transistor channel. In a block 100 in FIG. 1 there is a listing of an example of sorted pattern/keys extracted from a list of test fails in a database. The chip testing device typically creates a database for each chip that undergoes testing and the database gives test behavioral characteristics of the chip during the testing process (i.e., whether there were any test fails and/or process fails). The listing assigns a test fail key index number of from 0 to x (where x+1 is a maximum number of tests performed on a chip) to a listing of different test fail pattern names (e.g., TF_A. TF_B, etc.). Similarly, in a block 102 there is a listing of an example of sorted pattern/keys extracted from a list of process fails in the database. The listing assigns a process fail key index number of from 0 to y (where y+1 is a maximum number of process tests performed on a chip) to a listing of different process fail patterns (e.g., PF_A, PF_B, etc.). Each process fail on each wafer has an impact on the specific yield of that wafer. FIG. 1 also provides a block 104 that lists various exemplary test fails for different chips and wafers, the listed test fails also being stored in the database. Typically, several different types of test fails occur during testing of the wafer and/or chip on the wafer. One or more of the test fails may be more significant than others in terms of the frequency of occurrence of a particular test fail. Also provided is a block 106 that lists various exemplary process fails for various wafers, the listed process fails being stored in the database. For each listed wafer, the process fail name is given (e.g., A, B, C, etc.) along with the impact of that process fail on the chip or wafer yield.

FIG. 1 also provides a block 108 that gives an example of a generated array of the relationship of the process fails to the test fails. The row headings comprise the process fail key index (0 to y) and the process fail pattern names (PF_A, PF_B, etc.) from the block 102, while the column headings comprise the test fail key index (0 to x) and the test fail pattern names (TF_A, TF_B, etc.) from the block 100. For each position in the two dimensional array, the array entry is calculated using the formula given in the block 108 as v[x,y]= [(1−PF_Yield(y))*TF_amount(x, wafer 1)]+ . . . [(1− PF_Yield(y))*TF_amount(x, wafer m)]. In this equation, PF_Yield is a number between 0 and 1 that reflects the process yield of a particular wafer (i.e., each process fail on each wafer has an impact on the specific yield of that wafer), and TF_amount is the number of chips from any one wafer failing a test (A, B, etc.). In order to weight the Test Fail amount correctly, the PF_Yield(y) needs to be subtracted from 1 to make it a real "Yield Impact"; i.e., PF_Yield(y)=1 (no problem, no yield impact) means that the impact (1−PF_Yield(y)" is zero. As a result, in that example, the TF_amount (x, wafer m) does not participate in the result of v[x,y]. The equation above repeats this calculation for all m number of wafers available in a particular view or calculation. Typically two charts are created on a display screen associated with the chip test equipment: a first chart contains not normalized numbers while a second chart contains normalized numbers. FIG. 1 also illustrates for a number of wafers 110 both a number of defective chips 112 due to failed tests and the positions 114 for measurements of process parameters of wafer m, which are used to calculate yield impact for wafer based on process parameters tolerance range violations. In order to print an image from the generated array, the array content is normalized to the highest number found in the array underlying the image. The translation method between the array content and the image pixel color may be based on a lookup table.

Figure 2:
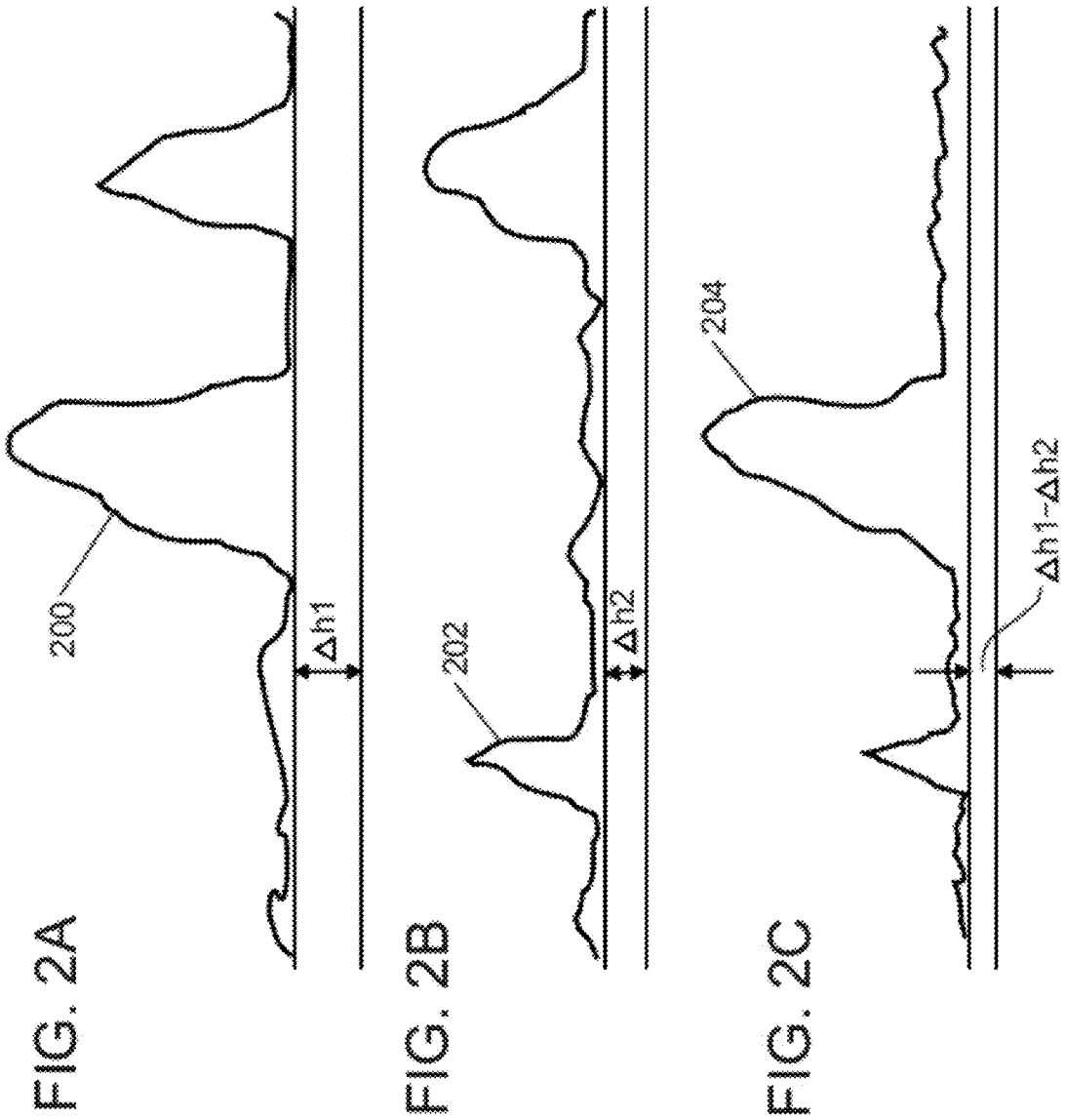
FIG. 2, including

Referring to FIG. 2, including FIGS. 2A-2C, there illustrated are graphs 200-204 of an example of a process-to-test-fail subtraction method utilizing mathematical functions according to an embodiment of the invention. The subtraction method, which typically eliminates common test fail signatures, correlates test fails to process fails resulting from a VLSI chip test. Thus, the subtraction method is a post-process type of method that may be run on any type of computer using the data from the chip test equipment database(s) relating to test fails and process fails resulting from the wafer and/or chip testing process. By filtering on a specific, dedicated test fail, all wafers will be detected which have this particular dedicated test fail. It is then possible to run a process fail (PF) to test fail (TF) analysis on only the wafers which exhibit the specific, dedicated test fail. This results in an Image #1 as shown in the graph 200 showing certain hotspots (e.g., high points in the graph 200), which potentially indicates a correspondence between test fails and process fails. A second Image #2 as shown in the graph 202 can be generated internally in memory using any filtered test fails. To obtain useful results from the subtraction method, test fails are used which are not included in Image #1. By subtracting the absolute value of the graph 202 of Image #2 from the graph 200 of Image #1 (i.e., abs(Image#1−Image#2)), the resulting graph 204 shows the different hotspots between both images which can be made visible. If there is a strong correlation between certain test fail(s) and process fails in Image #1, then Image #2 will show other process fail/test fail hotspots (assuming that the selected test fail(s) from Image #1 are the only ones affected by the process fails). With this subtraction method, common hotspots will be eliminated. Only differences will survive which indicate potential root causes for the dedicated test fail filtered for generation of Image #1 and/or Image #2. Possible interpretation of the resulting image for potential root cause analysis are: a) for example the process fails are due to out of range of valid manufacturing tolerances; or b) if there are no process fails in the area affecting the DUT/ circuitry in mind on chip, then someone may conclude that it is either a test pattern problem or even a design issue.

An embodiment of the subtraction method may be performed using the following steps. First, the process fails (PF) and test fails (TF) of both images are extracted by the chip test equipment to build a common list of process fails and another common list of test fails (FIG. 1). Second, using the common list of process fails, all cross points [PF, TF] are checked as to whether they are available in both images (arrays). If so, translate the array content of [PF, TF] to color code (normalize) of both images (arrays) and subtract one (color) value from the other: abs(val1−val2) and store the value in a result array at an index for [PF, TF]. Third, if [PF, TF] is not in both arrays/images #1 and #2, then copy the value from the image which has the array index defined for [PF, TF] into the result array at index for [PF, TF] (no subtraction necessary in this case). Complete these first three steps for all [PF, TF]. Fourth, create a new color lookup table with continuous color scale for back annotation of the content of the result array at index [PF, TF] into an RGB color value. The content of the lookup table may be customizable and user specific. Fifth, print the pixel at the position representing an array index [PF, TF], which is a rectangular representation of the result array with dimension x representing, e.g., the test fail (TF) and dimension y representing, e.g., the process fail (PF) using the color lookup table from step 4.

Figure 8:
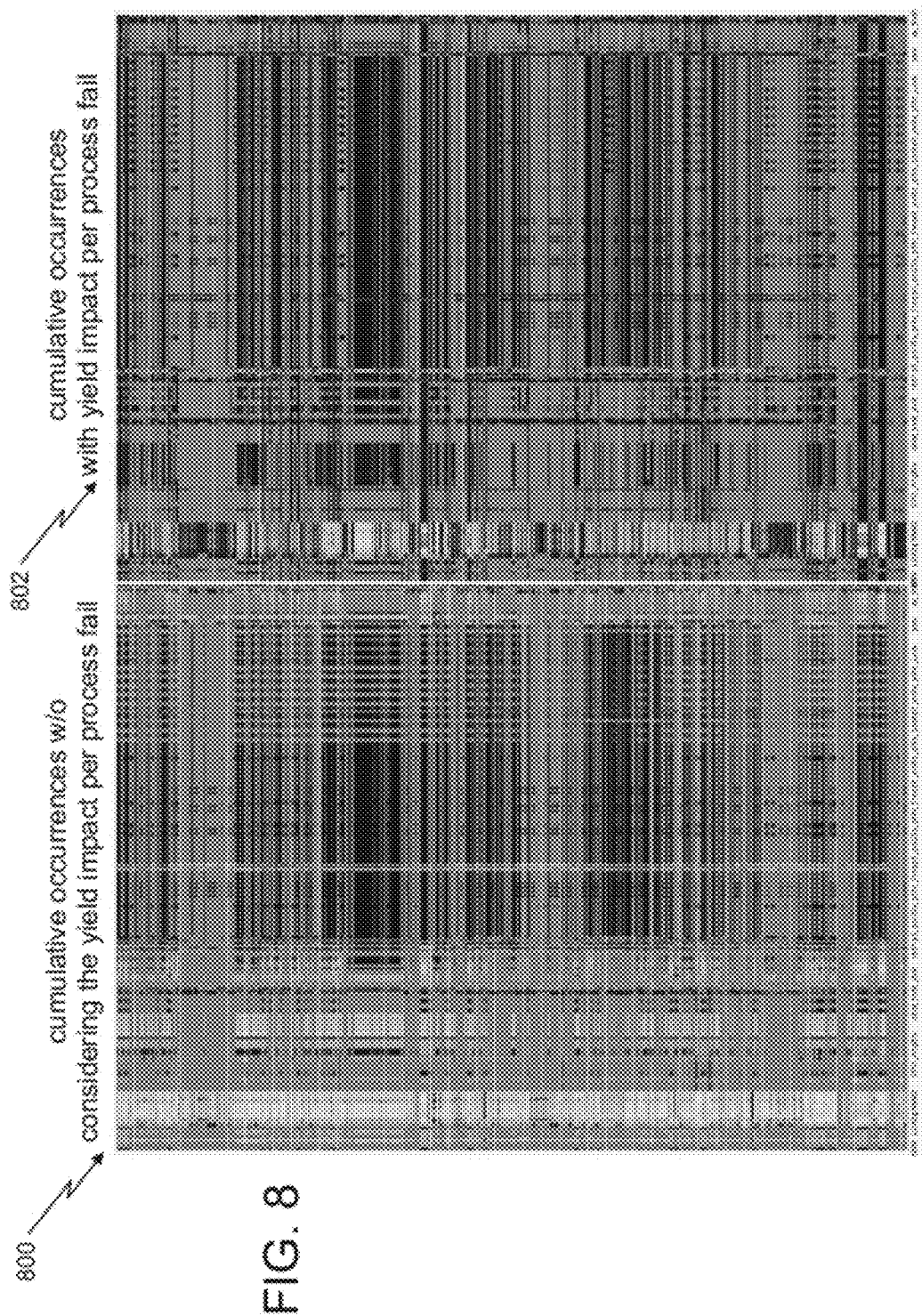
FIG. 8 is a first pair of charts illustrating a process to test fail correspondence.
Figure 9:
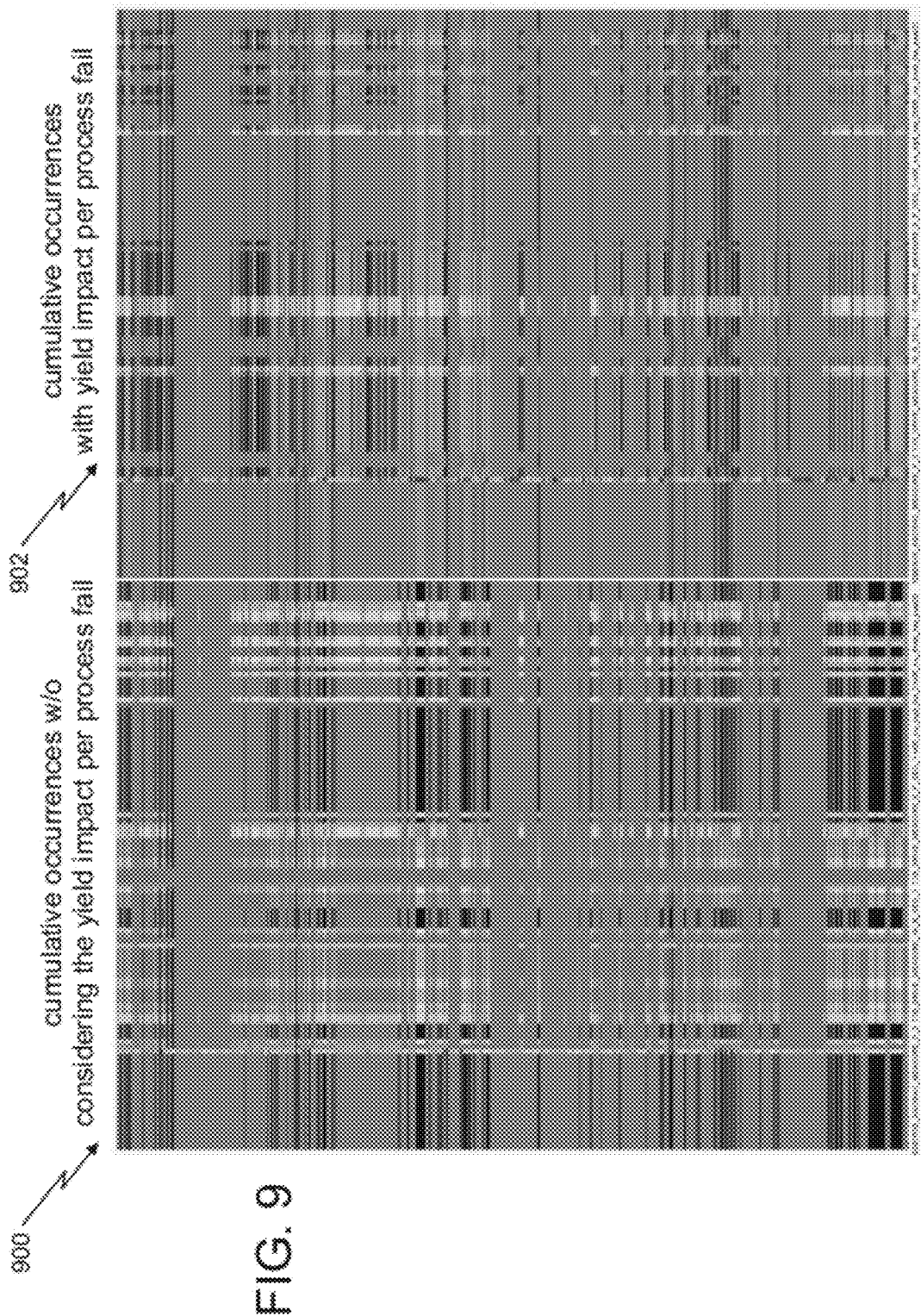
FIG. 9 is a second pair of charts illustrating a process to test fail correspondence.

Referring to FIG. 3, there illustrated are various examples 300-310 of the subtraction of one color from another used in the subtraction method of FIG. 2 of embodiments of the invention. Also illustrated is a color coding reference 312 that illustrates on a scale of from 0 to 100 the color spectrum utilized in an exemplary embodiment of the color subtraction method of FIG. 2 described hereinabove. The color coding reference 312 begins with the color black at the 0 end of the reference scale 312 and proceeds through various colors in the spectrum ending at the color red at the 100 end of the reference scale 312. It should be understood that the colors in the examples 300-310 are only approximations of the colors in the color coding reference 312. That is, slight differences may exist between the colors in the reference 3112 and those colors in the examples 300-310. Example 1 300 illustrates that red subtracted from red equals black. The other examples 302-310 of various color subtractions are given in FIG. 3. Special cases are the unused cross point(s): not every test fail is occurring on every wafer or chip. Also, not every process fail exists on every wafer. Since FIGS. 8 and 9 show all test and process fails merged together in one chart, there are cases where cross points exist and others where they do not exist. For those cross points that do not exist in combination on neither wafer nor chip, a reserved color needs to be defined. In the present example in FIGS. 8 and 9, that reserved color is grey.

Figure 4:
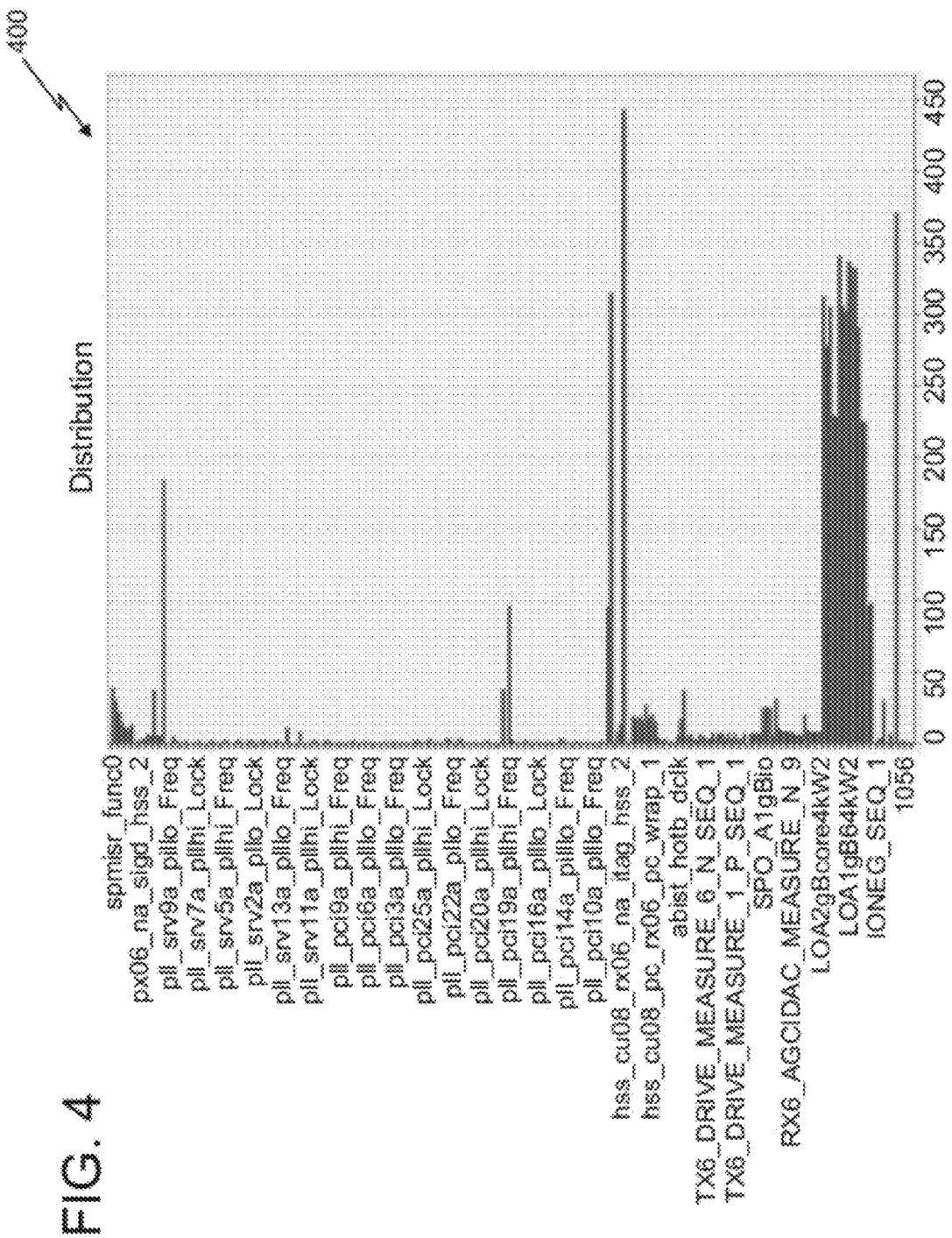
FIG. 4 illustrates a distribution of exemplary test fail frequencies as detected by chip test equipment for various chip fail and stored in a database.
Figure 5:
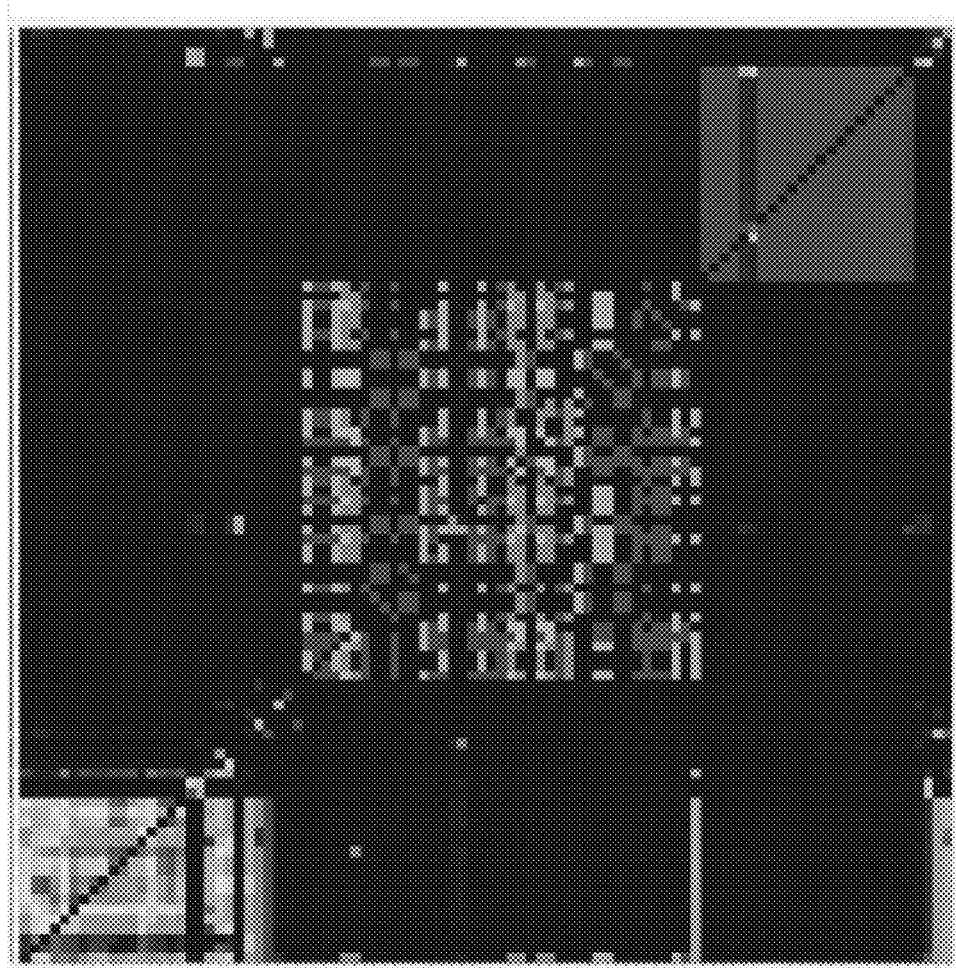
FIG. 5 illustrates a graphical output of common test fail signatures from the array as calculated similar to the array of FIG. 1.
Figure 6:
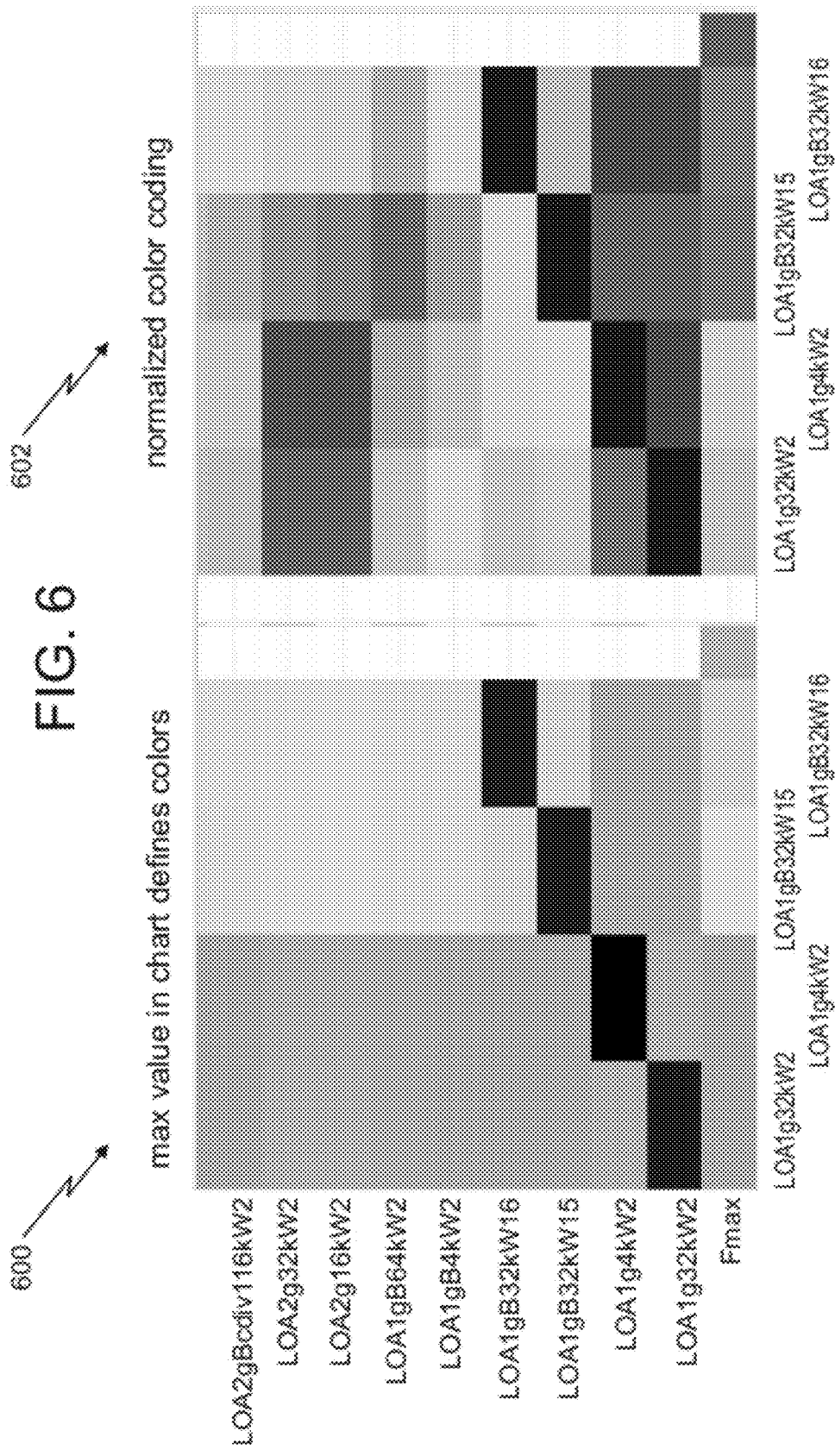
FIG. 6 are more detailed diagrams of certain regions of the graph of FIG. 5 zooming into certain regions or areas of interest to obtain details on test fail relationships in a particular common test fail relationship signature case.
Figure 7:
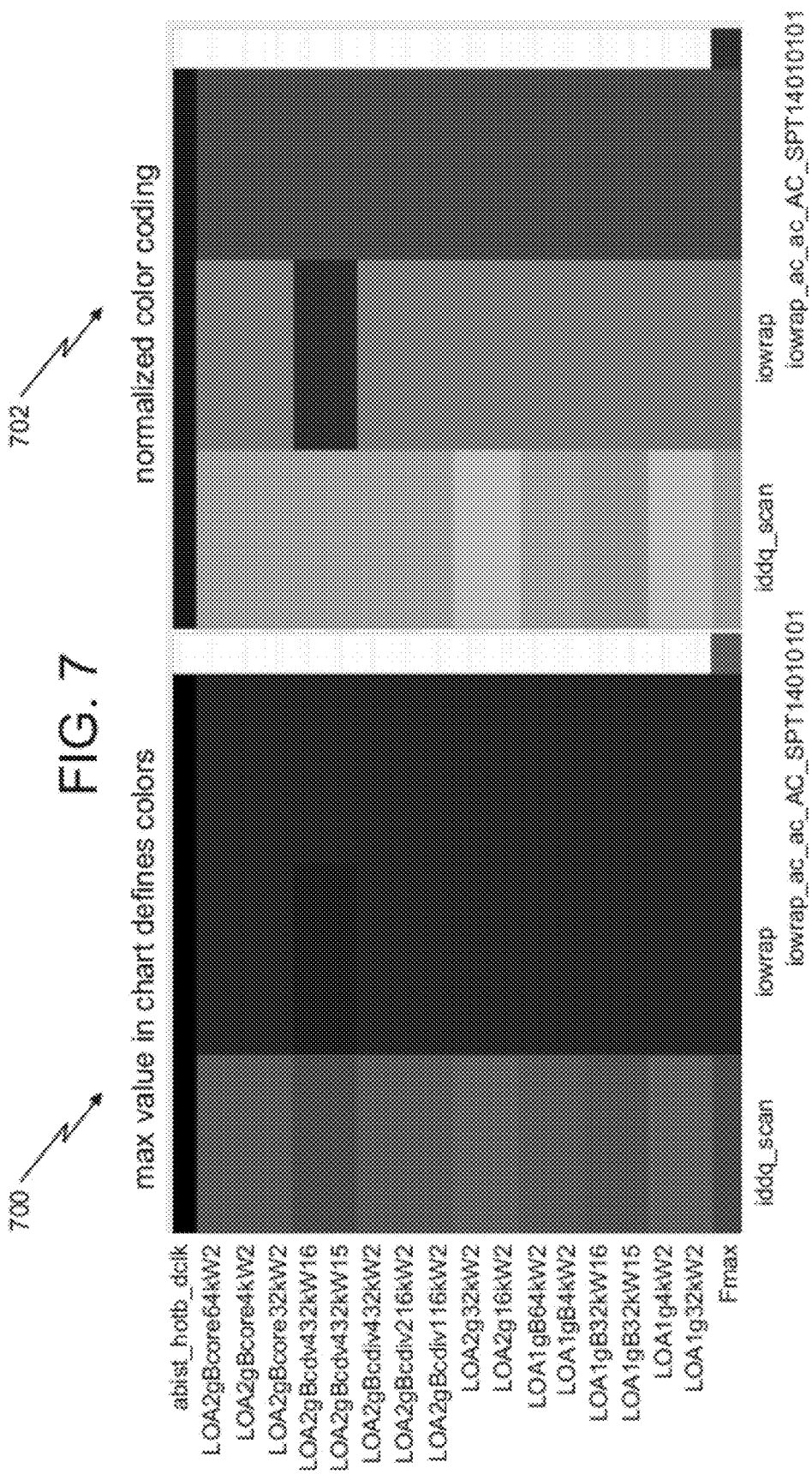
FIG. 7 are more detailed diagrams of certain regions of the graph of FIG. 5 zooming into certain regions or areas of interest to obtain details on test fail relationships in a another particular common test fail relationship signature case.

In an example of the subtraction method according to an embodiment of the invention, FIG. 4 illustrates a distribution 400 of exemplary test fail frequencies as detected by the chip test equipment for various chip fail and stored in a database. FIG. 5 illustrates a graphical output 500 of common test fail signatures from the array as calculated similar to the array of FIG. 1. In FIG. 5, the colors are normalized to the relative correspondence between different test fails in a linear manner. Also, a non-normalized chart is available with maximum value defining the color coding. This chart is not shown in FIG. 5. In FIG. 6, the user (e.g, the test engineer) can zoom into the graph 500 of FIG. 5 into certain regions or areas of interest 600 (non-normalized), 602 (normalized) and obtain details on test fail relationships—in this case, a common test fail relationship signature case. FIG. 7 is similar to that of FIG. 6, but for a different common test fail relationship case.

Figure 10:
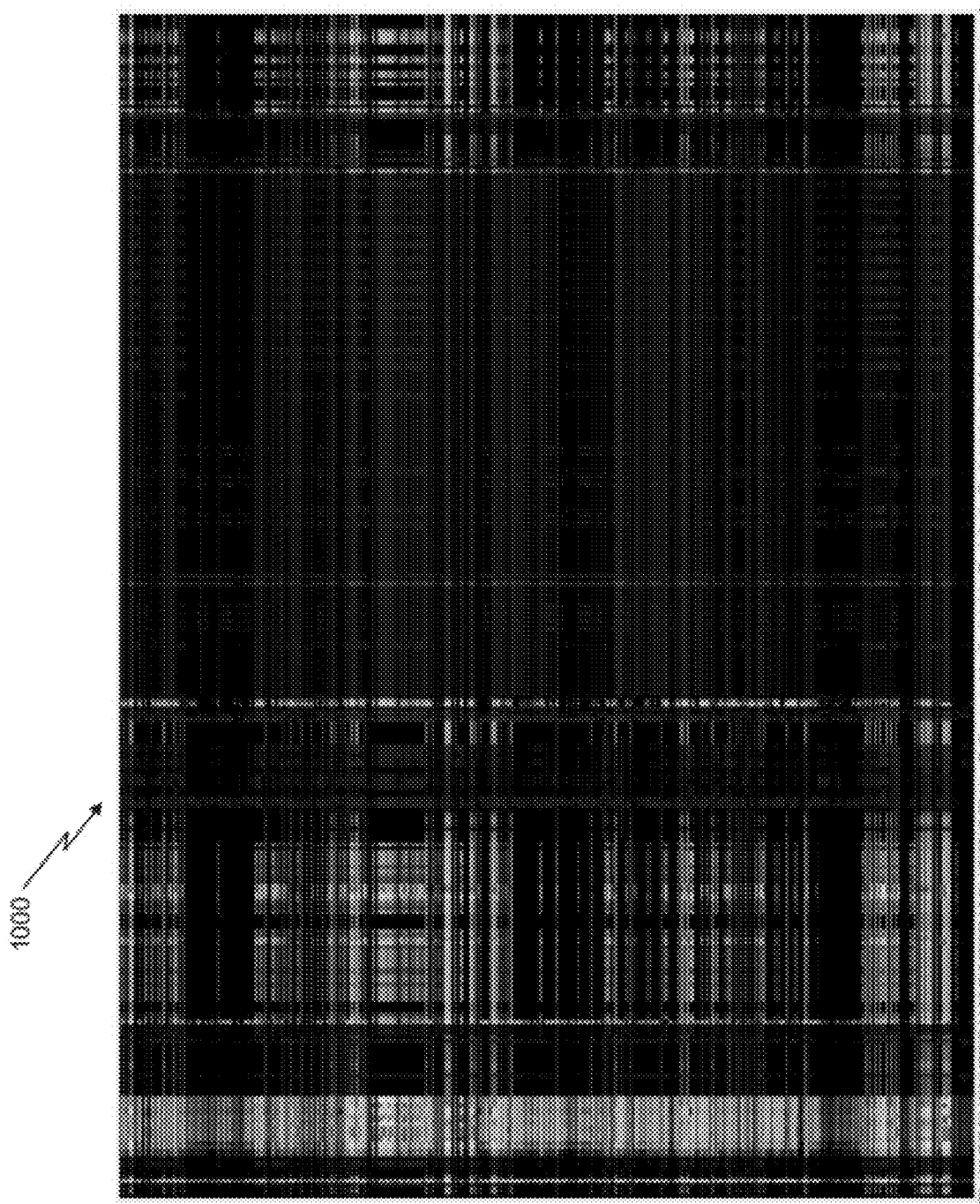
FIG. 10 illustrates a chart that is the result of the subtraction of one of the charts from FIG. 9 from one of the charts of FIG. 8 using the subtraction method of an embodiment of the invention illustrated in FIG. 2.

Referring to FIG. 8, there illustrated is a first pair of charts 800, 802 illustrating a process to test fail correspondence, while FIG. 9 illustrate a second pair of charts 900, 902 illustrating a process to test fail correspondence. In the charts 800, 900, the colors are defined by the maximum value in the chart without consideration of Yield per process fail. Instead, it always assumes a maximum yield impact of 1. In other words, in every case of actual PF_Yield(y)<1, the PF_Yield(y) is assumed to be zero. These charts are used only for reference to identify "hotspots" defined by the ratio of: 1/[wafers/TF_amount(x, wafer 1 . . . m)]. There, various possibilities exist to calculate v[x,y]. The left hand charts 800, 900 and the ratio given above is only one way to do so. The more interesting ones are the charts 802, 902 on the right hand side of the corresponding Figures. Again, color coding is based on maximum value in the charts, but the chart is considering now the Yield per process fail and using the formula for v[x,y] given hereinabove in the block 108 in FIG. 1. As used herein, "considering Yield" means taking into account a weighting for all of the failing chips that are tested. This allows for better indication of relevant hotspots from the charts 802, 902. FIG. 10 illustrates a chart 1000 that is the result of the subtraction of the chart 902 from the chart 802 using the subtraction method of an embodiment of the invention described herein and illustrated in FIG. 2. In general, in the chart 1000 of FIG. 10 the black areas are in general indicative of the lowest probability of fails.

Figure 11:
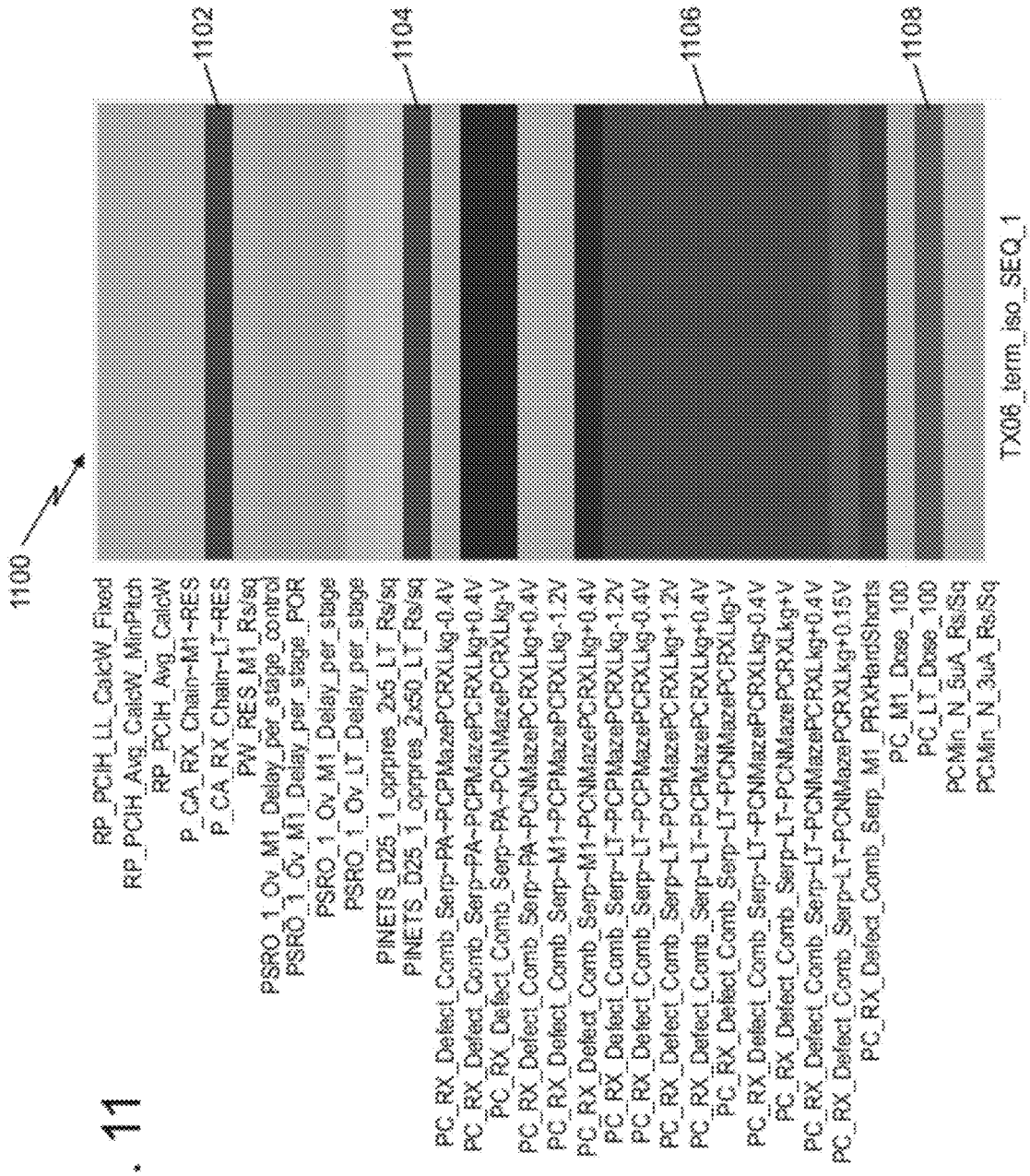
FIG. 11 illustrates a chart which shows a zoom or more detailed view of a process fails chart.
Figure 12:
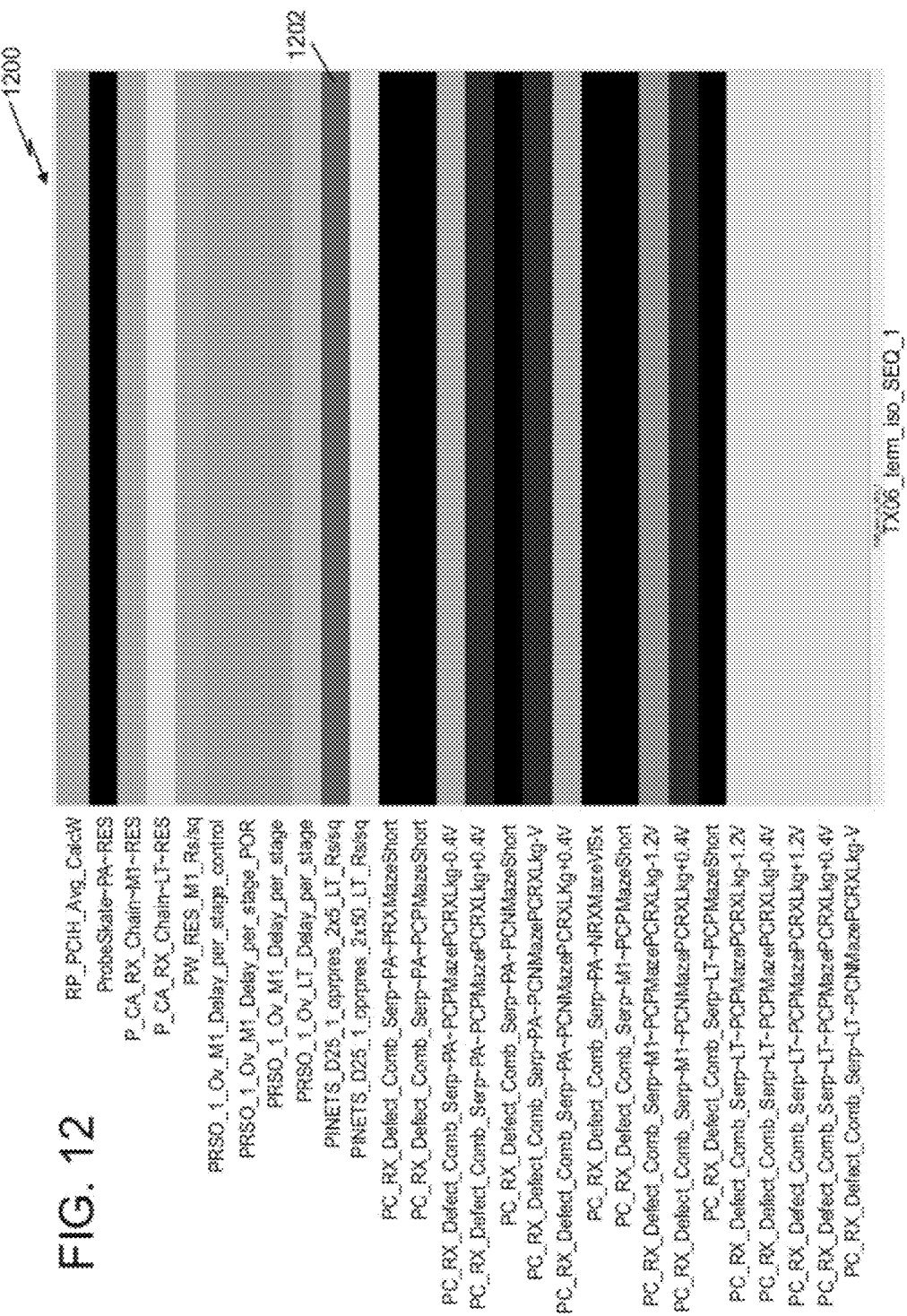
FIG. 12 illustrates a zoom subtracted chart in which a second chart has been subtracted from the chart of FIG. 11 using the subtraction method according to an embodiment of the invention.

Referring to FIG. 11, there illustrated is a chart 1100 which shows a zoom or more detailed view of a process fails chart. This chart 1000 contains several red colored areas 1102-1108. However, the user (e.g., the test engineer) may not necessarily know which one of the red colored areas or "hotspots" 1102-1108 is the most important or the root cause. Nevertheless, referring to FIG. 12, a zoom subtracted chart 1200 is illustrated there in which a second chart stored in the database or in memory has been subtracted from the chart 1100 of FIG. 11 using the subtraction method according to an embodiment of the invention. The desired test fail is now illustrated as the red colored area 1202.

Embodiments of the invention are concerned with relatively large amounts of information or data that must be analyzed and presented in a relatively compact manner to identify relevant information in a small amount of time. In particular, embodiments of the invention are concerned with various tasks, including identifying common test fail signatures relatively easily, presenting the correlation of a relatively large amount of unrelated data concerning test fails and process fails, finding potential indicators of redundant test patterns without looking at the complex test model, and identifying test fails depending on process fails that are sometimes intentionally induced, where the process fails are utilized instead of random defects or circuit design weakness.

Generally, the method embodiments described herein may be implemented on a general-purpose computer and the method may be coded as a set of instructions on removable or hard media for use by the general-purpose computer. FIG. 13 is a schematic block diagram of a general-purpose computer suitable for practicing embodiments of the present invention. In FIG. 13, computer system 1300 has at least one microprocessor or central processing unit (CPU) 1305. CPU 1305 is interconnected via a system bus 1310 to a random access memory (RAM) 1315, a read-only memory (ROM) 1320, an input/output (I/O) adapter 1325 for a connecting a removable data and/or program storage device 1330 and a mass data and/or program storage device 1335, a user interface adapter 1340 for connecting a keyboard 1345 and a mouse 1350, a port adapter 1355 for connecting a data port 1360 and a display adapter 1365 for connecting a display device 1370.

ROM 1320 contains the basic operating system for computer system 1300. The operating system may alternatively reside in RAM 1315 or elsewhere as is known in the art. Examples of removable data and/or program storage device 1330 include magnetic media such as floppy drives and tape drives and optical media such as CD ROM drives. Examples of mass data and/or program storage device 1335 include hard disk drives and non-volatile memory such as flash memory. In addition to keyboard 1345 and mouse 1350, other user input devices such as trackballs, writing tablets, pressure pads, microphones, light pens and position-sensing screen displays may be connected to user interface 1340. Examples of display devices include cathode-ray tubes (CRT) and liquid crystal displays (LCD).

A computer program with an appropriate application interface may be created by one of skill in the art and stored on the system or a data and/or program storage device to simplify the practicing of embodiments of the invention. In operation, information for or the computer program created to run the embodiments of the present invention is loaded on the appropriate removable data and/or program storage device 1330, fed through data port 1360 or typed in using keyboard 1345.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
    generating a first image by performing an analysis on a set of process fails and a set of test fails that each contains at least one test fail which occurs more often than others within the set of test fails, wherein the test fails occur on at least one wafer under test;
    generating a second image by performing an analysis on the set of process fails and on at least one test fail of the set of test fails that do not contain the at least one test fail which occurs more often than others within the set of test fails; and
    subtracting the second image from the first image to generate a resulting image, wherein the resulting image indicates any potential root causes for the at least one test fail which occurs more often than others within the set of test fails.

2. The method of claim 1, wherein the first image, the second image and the resulting image all contain colored pixels indicative of the presence of failures within the at least one wafer under test.

3. The method of claim 1, wherein the set of test fails result from testing of the at least one wafer for at least one failure.

4. The method of claim 1, further comprising storing the first and second images in memory.

5. The method of claim 1, wherein at least one of the set of process fails results from testing of the at least one wafer for at least one process failure.

6. The method of claim 1, wherein generating the second image from at least one of the test fails includes using any of the test fails that are not included in the first image.

7. The method of claim 1, wherein subtracting the second image from the first image to generate a resulting image comprises forming the absolute value of the difference between the first and second images.

8. A computer program product, comprising:
    a computer readable storage medium having a computer-readable computer program code for a method; and
    instructions for causing a computer to implement a method, the method further comprising:
    generating a first image by performing an analysis on a set of process fails and a set of test fails that each contains at least one test fail which occurs more often than others within the set of test fails, wherein the test fails occur on at least one wafer under test;
    generating a second image by performing an analysis on the set of process fails and on at least one test fail of the set of test fails that do not contain the at least one test fail which occurs more often than others within the set of test fails; and
    subtracting the second image from the first image to generate a resulting image, wherein the resulting image indicates any potential root causes for the at least one test fail which occurs more often than others within the set of test fails.

9. The computer program product of claim 8, wherein the first image, the second image and the resulting image all contain colored pixels indicative of the presence of failures within the at least one wafer under test.

10. The computer program product of claim 8, wherein the set of test fails result from testing of the at least one wafer for at least one failure.

11. The computer program product of claim 8, further comprising storing the first and second images in memory.

12. The computer program product of claim 8, wherein one or more of the set of process fails result from testing of the at least one wafer for at least one process failure.

13. The computer program product of claim 8, wherein generating a second image from any one of the test fails includes using any of the test fails that are not included in the first image.

14. The computer program product of claim 8, wherein subtracting the second image from the first image to generate a resulting image comprises forming the absolute value of the difference between the first and second images.

15. A system, comprising:
a computing network including a processing device in communication with one or more computer memory storage devices; and
the computing network further configured to implement a method, the method further comprising:
generating a first image by performing an analysis on a set of process fails and a set of test fails that each contains at least one test fail which occurs more often than others within the set of test fails, wherein the test fails occur on at least one wafer under test;
generating a second image by performing an analysis on the set of process fails and on at least one test fail of the set of test fails that do not contain the at least one test fail which occurs more often than others within the set of test fails; and
subtracting the second image from the first image to generate a resulting image, wherein the resulting image indicates any potential root causes for the at least one test fail which occurs more often than others within the set of test fails.

16. The system of claim 15, wherein the first image, the second image and the resulting image all contain colored pixels indicative of the presence of failures within the at least one wafer under test.

17. The system of claim 15, wherein the set of test fails result from testing of the at least one wafer for at least one failure.

18. The system of claim 15, further comprising storing the first and second images in memory.

19. The system of claim 15, wherein one or more of the set of process fails result from testing of the at least one wafer for at least one process failure.

20. The system of claim 15, wherein generating a second image from at least one of the test fails includes using any of the test fails that are not included in the first image.

21. The system of claim 15, wherein subtracting the second image from the first image to generate a resulting image comprises forming the absolute value of the difference between the first and second images.

22. A method, comprising:
determining one or more process fails on a wafer hosting a chip under test;
determining one or more test fails on the wafer under test;
analyzing the one or more process fails to the one or more test fails on the wafer under test using a selected one of the one or more test fails;
generating an array that correlates the one or more process fails to the selected one of the one or more test fails;
generating a first image from the generated array;
generating a second image from any one or more of the test fails that do not contain the selected one of the one or more test fails; and
subtracting the second image from the first image to generate a resulting image, wherein the resulting image indicates any differences between the first and second images.

23. The method of claim 22, wherein generating a second image from any one or more test fails includes using any of the test fails that are not included in the first image.

24. The method of claim 22, wherein subtracting the second image from the first image to generate a resulting image comprises forming the absolute value of the difference between the first and second images.

25. The method of claim 22, wherein the any differences between the first and second images indicates any potential root causes for the selected one of the test fails.

* * * * *